United States Patent

George et al.

[11] Patent Number: 6,042,863
[45] Date of Patent: *Mar. 28, 2000

[54] METHOD FOR SKINNING THE SEEDS OF LEGUMES, DRUPES, AND GRAINS

[75] Inventors: Dewey P. George, San Andreas; Ronald James Rigge, Pleasanton; Delbert L. Williams; Ronald E. Kaiser, both of Valley Springs, all of Calif.; Lewis M. Carter, Jr., Donalsonville, Ga.

[73] Assignee: AnKel, Inc., Waterford, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/894,360

[22] PCT Filed: Feb. 21, 1995

[86] PCT No.: PCT/US95/02176

§ 371 Date: May 4, 1998

§ 102(e) Date: May 4, 1998

[87] PCT Pub. No.: WO96/25862

PCT Pub. Date: Aug. 29, 1996

Related U.S. Application Data

[63] Continuation-in-part of application No. 08/035,721, Mar. 23, 1993, Pat. No. 5,391,389.

[51] Int. Cl.$^7$ .................................................. A23L 1/36
[52] U.S. Cl. ........................ 426/484; 426/481; 426/539; 426/626; 426/632; 426/634; 426/636
[58] Field of Search .................................. 426/634, 481, 426/484, 632, 636, 539, 626

[56] References Cited

U.S. PATENT DOCUMENTS

| | | | |
|---|---|---|---|
| 2,155,923 | 4/1939 | Armstrong | 99/231 |
| 2,651,345 | 9/1953 | Schoolcraft | 146/231 |
| 3,520,340 | 7/1970 | Takeuchi | 146/231 |
| 4,276,316 | 6/1981 | Sharma | 426/466 |
| 5,391,389 | 2/1995 | George et al. | 426/634 |

*Primary Examiner*—Helen Pratt
*Attorney, Agent, or Firm*—Limbach & Limbach

[57] ABSTRACT

A method and apparatus for removing the skins or hulls from seeds, including those of legumes, grains, drupes, silques, and achenes involves wetting the seeds with an alkaline solution and then with a peroxygen solution. The two substances react underneath the skin to liberate gas between the seed meat and the skin. The gas bubbles blister the skin, causing it to become loosened. Slight mechanical action is used to dislodge the blistered skins from the seed meats.

2 Claims, 1 Drawing Sheet

METHOD FOR SKINNING THE SEEDS OF LEGUMES, DRUPES, AND GRAINS

This application is a 371 of PCT/US95/02176 filed Feb. 21, 1995 a Continuation-in-Part of now-allowed application Ser. No. 08/035,721, filed Mar. 23, 1993 now U.S. Pat. No. 5,391,389.

FIELD OF THE INVENTION

The present invention relates to the field of removing the skin or hulls from seeds used for food consumption, such as nuts and the seeds of legumes, grains, drupes, silques, achenes, and other products.

BACKGROUND OF THE INVENTION

The seeds of many fruits such as legumes, grains, silques and drupes are comprised of a meat that is covered by a skin or seed coat (the term "seed" as used herein will be intended to include the seeds of products such as legumes, grains, drupes, achenes, silques and other types of seeds used for food products). Beans, corn, and coffee beans are examples of seeds from legumes, grains, and drupes, respectively. Rape seed is one example of seed which comes from silques. Sunflower seeds and buckwheat are seeds which come from a type of fruit called an achene.

A nut is a one-seeded fruit which, for purposes of this application will be referred to as a "seed". The nut kernel, which is the component of the nut that remains after shelling, is comprised of a nut meat that is covered by a brownish skin. Skinning of a nut kernel is commonly referred to as "blanching."

Removal of the skin or hull for such seeds is desired for a variety of reasons. For example, some skins, such as those found on coffee beans, hazelnuts, and Brazil nuts have unpleasant bitter tastes. For other seeds, such as almonds, removal of the skin is desired to prevent the skin from coloring foods that are prepared using the seeds. Skin or hull removal for seeds in the grain family, such as wheat and corn, is desired for the production of certain grain products such as wheat flour and masa. It is also desirable to remove the skin or hull from certain seeds so that the skin or hull may be used as dietary fiber for humans or other animals.

Various processes have been used for removing the skin from seeds. These processes have enjoyed limited success. For the most part, existing processes are unsatisfactory because they do not completely remove the skin without abrading away significant amounts of meat or because they involve temperatures or substances which adversely affect the taste, appearance or shelf life of the seeds.

Because many seeds are small in size, it is difficult to abrade the skins from the seeds without significant loss of meat. Mechanical abrasion of these seeds may result in loss of a substantial portion of the valuable seed meat. Certain nuts, such as hazelnuts and Brazil nuts, have a tightly adhering skin which is difficult to remove due to deeply embedded vein networks. The convoluted surfaces of these and other nuts, such as almonds, make it difficult to abrade the skins from the nuts without significant loss of nut meat. Often mechanical abrasion of these nuts results in a loss of 10 to 20% of the valuable nut meat.

Some existing processes for skinning seeds involve removing the skins by high pressure jets of water or by scalding water. Unfortunately, high water pressure also may erode areas of the meat and create pits in the surface of the seeds. Breakage is also known to occur, which is particularly undesirable for products which are marketed in whole form. Further, seeds treated with these methods tend to absorb water and thus require drying, a process which can weaken the flavor of the seeds.

The skins of corn and beans such as red beans, broad beans and peas are often removed after the products have been boiled, because boiling loosens the skins of these products. This process causes the beans to absorb water and thus has limited applicability in contexts where a dryer product is desired. The hulls of coffee beans are commonly removed using pneumatic separators, which are sometimes unsuccessful at completely removing the hulls, or by soaking which requires substantial drying time following soaking.

In a common chemical process for removing skins from some seeds such as nuts, seeds are first immersed in an alkaline bath, subsequently immersed in an acid bath, and finally subjected to mechanical abrasion. However, the acid leaves the seeds with an unpleasant bitter taste and may reduce their shelf life. Moreover, the concentrations of the chemical solutions dilute over the soaking period because of debris introduced into the solutions by the seeds. Dilution makes regulation of the concentration of the solutions highly difficult and renders these processes unfeasible for large scale blanching operations.

Some products are skinned using hot caustic soaking. In hot caustic soaking, the products are soaked in hot (i.e. approximately 180° F.) sodium hydroxide solution and subsequently peeled using mechanical abrasion. During soaking the hot caustic penetrates below the skin, softening the flesh underlying the skin. This softened flesh is abraded away during the mechanical peeling step, resulting in loss of valuable product. Moreover, use of sodium hydroxide—a caustic agent frequently referred to as lye—produces toxic effluents which, for environmental reasons, are difficult to dispose of. Processes using lye are strongly alkaline and produce unstable alkaline solutions above pH 9 which require neutralization before final disposal.

Finally some seed products, such as hazelnuts, are skinned by roasting followed by light mechanical abrasion of the skins from the seeds. Although this method is satisfactory at removing the skins, it produces seeds having a roasted flavor.

SUMMARY OF THE INVENTION

It is an object of the present invention to provide a method and apparatus for removing the skin from seeds without adversely affecting the taste, appearance, or shelf life of these products and without abrading away valuable meat. It is another object of the present invention to provide a method for quickly removing the skin from seeds without producing toxic emissions, effluents, or residues.

The present invention involves wetting the seeds in two steps: first with an alkaline solution and then with a peroxygen solution. The two substances then react to liberate gases underneath the skin. The gas bubbles blister the skin or hull, causing it to become loosened. The peroxygen solution also prevents the discoloration of the seeds that would otherwise be caused by the alkaline solution.

A mechanical device is used to separate the blistered skins from the meats.

DETAILED DESCRIPTION OF THE INVENTION

Figure 1:
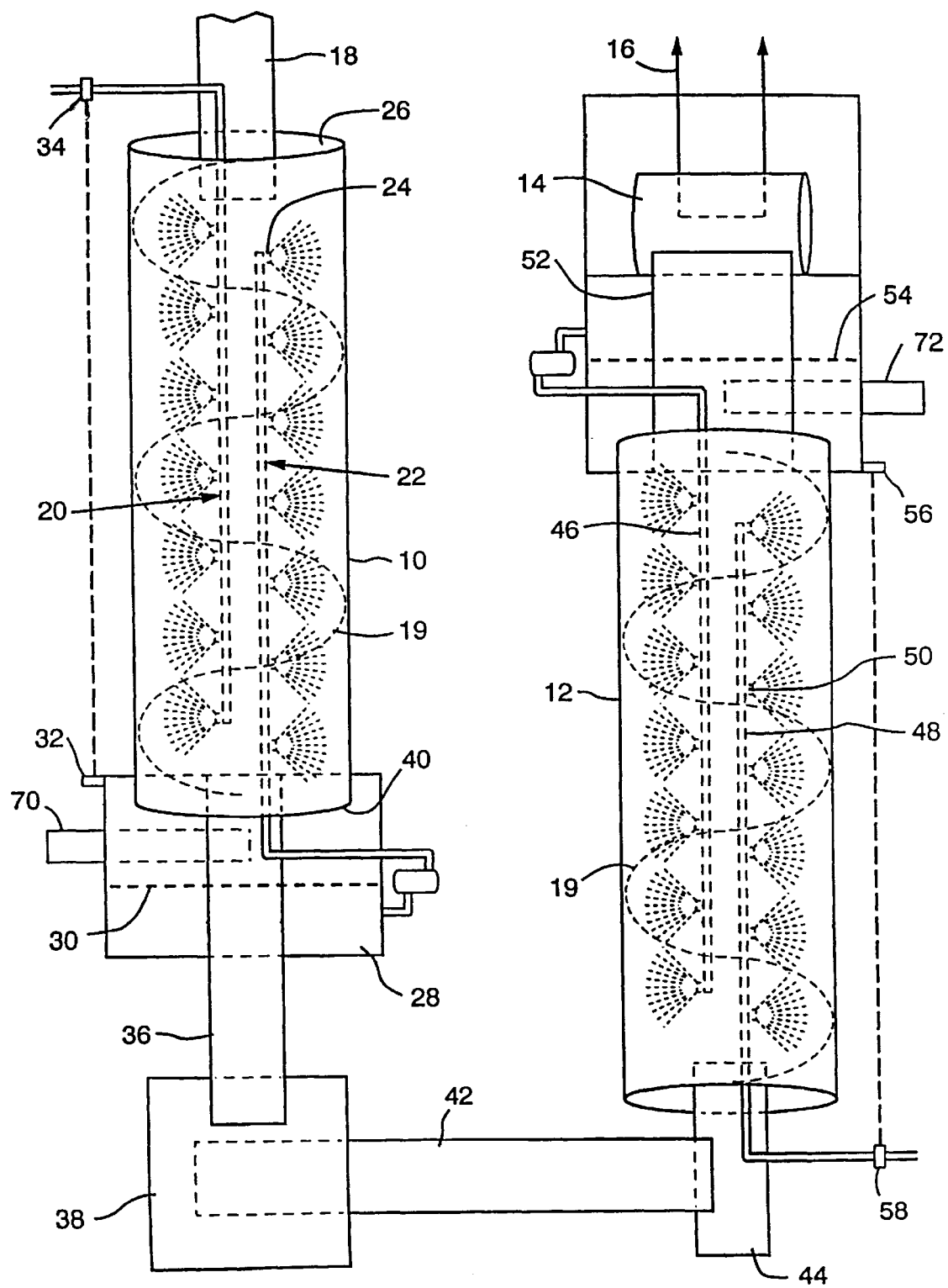
FIG. 1 is a schematic representation of a skinning apparatus usable to remove the skins of the seeds of legumes, grains, drupes and the like according to the method of the present invention.

For the purposes of this discussion, the term "skin" will be used to represent both seeds and hulls. The term "seed" will be used to represent a seed after it has been removed from a shell, if the seed is one (e.g. an almond or hazelnut) which comes in a shell, or after it has been removed the fruit, pod, cone or other structure in which it grows.

The method of the present invention generally involves wetting of the seeds with an alkaline solution, wetting of the seeds with a peroxygen solution, and mechanical removal of the skins from the seeds. A method of this type as applied to nuts is described and claimed in U.S. Pat. No. 5,391,389, the application of which the present application is a continuation-in-part and which is incorporated herein by reference.

The first step of the process preferably involves wetting the seeds with an alkaline solution. Alkaline solutions are known to partially break the bonds which adhere the cellulosic skin to the seed meat. The preferred method utilizes food grade sodium carbonate, although other alkaline agents such as sodium bicarbonate, sodium silicates, sodium phosphates, and borates have been shown to work well. Alkaline salts of lithium, potassium, magnesium, and calcium will work satisfactorily but are more costly to use.

It is believed that alkaline solutions of 0.1% to saturated (e.g. 0.1%–10% sodium bicarbonate or 0.1%–15% sodium carbonate) having approximate temperatures of 40 to 200° F. are useful in carrying out the first step of the process, particularly when applied to the seeds for durations of between 5 seconds and 300 minutes.

The preferred concentration for the alkaline material is in the range of approximately 1–3%. The preferred temperature range is approximately 80°–150° F. so that the seeds may be quickly skinned without becoming cooked or soggy. For the same reason, the preferred application time for the alkaline step is approximately 30 sec–10 minutes.

Removal of the skins from nuts (a process often called "blanching"), alkaline solutions of 1% to saturated having approximate temperatures of 5 to 49° C. (40 to 120° F.) are preferable for use in the process, particularly when applied to the nuts for durations of between 20 seconds and 20 minutes. In the preferred method for blanching nuts, the nuts are wetted with 10% $Na_2CO_3$ at 35° C. (95° F.) for 2 to 3 minutes. Exposure time may be increased to up to 10 minutes if accompanied by a reduction in temperature to 21° C. (70° F.). While the blanching will be successful at prolonged exposure times and/or temperatures in excess of 50° C. (122° F.), these conditions tend to make the nuts more fragile and also may reduce shelf life and for these reasons should preferably be avoided.

The seeds are next preferably allowed to drain at ambient temperature. While draining is not required for successful skinning, it allows the alkaline material to soak into the skin in order to thoroughly moisten the skin. This is important because it is preferable for the reaction between the alkaline solution and the peroxygen solution applied in the second step to occur between the skin and the nut meat. For some seeds, draining at ambient temperature may also be beneficial in that it can allow cooling of the seeds and it thereby reduces the likelihood of rancidity, breakage, and reduced shelf life. Drying at ambient temperature may last up to 30 minutes without significant adverse consequences.

After draining, the seeds are wetted using a peroxygen compound. Hydrogen peroxide is preferred for economic reasons and also because it removes the discoloration of the meats caused by the alkaline solution. Other preferred solutions are sodium peroxides, percarbonates, perborates and persulfates, however these are more expensive chemicals and are thus more costly to use in the process.

It is believed that peroxygen concentrations of 2–35% (and preferably 8–25%) work particularly well in the process when applied to the seeds at temperatures of approximately 8° to 180° F. for durations of between ½ minute and 300 minutes. The preferred ranges for application time and temperature for the peroxygen step are approximately 30 seconds–10 minutes and 120°–160° F.

For nuts, peroxygen concentrations of 10–40% work particularly well in the process when applied to the nuts at temperatures of approximately 10° to 79° C. (50 to 175° F.) for durations of between ½ minute and 20 minutes. Although blanching will be successful when the nuts are treated with peroxygen solutions having temperatures greater than 80° C. (176° F.) or if they are exposed for periods of longer than 200 seconds to peroxygen solutions having temperatures of 77° C. (170 F.) or higher, these conditions should preferably be avoided to prevent cooking, rancidity, and breakage of the nuts. For economic reasons, the nuts are preferably treated for 150 seconds with a 15% solution of hydrogen peroxide maintained at 65° C. (149° F.).

Once the seeds have been exposed to the hydrogen peroxide, the hydrogen peroxide and the sodium carbonate chemically react to liberate gas. Because the alkaline material has been allowed to permeate the skin, gas bubbles form between the seed skin and the seed meat causing blistering and loosening of the skin. An appropriate mechanical method such as light brushing, rubbing or tumbling is used to dislodge the loosened skins and the seeds are allowed to dry.

EXAMPLES

Following is experimental data obtained during application of the process to legume seeds (specifically, beans), grain seeds (specifically, corn) and drupe seeds (specifically, coffee beans). This data is given by way of example, and should not be construed as limiting the claims herein.

A. Beans

The process according to the present invention was applied to 50 g of beans. Pale pink kidney beans were used in the experiment, although the process is believed useful for many types of beans, including lima, pinto, garbanzo, and black beans, particularly when the beans are fresh. Fifty grams of beans were wetted with a 2% solution of sodium carbonate hydrate at 125° F. for approximately 3 minutes to thoroughly moisten the skin. The quantity of solution used was 10 g, an amount just sufficient to completely moisten the skin with only a small amount of excess.

The beans were drained and subsequently wetted with approximately 10 ml of 20% hydrogen peroxide solution at 155° F. for approximately 3 minutes. The amount of hydrogen peroxide solution applied to the skin is an amount sufficient to wet the skins with only a small amount of excess solution. By the end of the three minutes, the beans skins were puffed and separated from the bean kernel. The skins could be easily removed by mild mechanical action, such as brushing, rubbing, and/or tumbling.

Although the present example has been given with respect to beans, it should be understood the process according to the present invention may successfully remove the skins from the seeds of various other legumes, including, but not limited to, pinto beans, garbanzo beans, black beans, lima beans, and peas.

B. Corn

Three experiments were carried out in which the process according to the present invention was used on corn. In the first run, fresh corn kernels were wetted for 2 minutes using an 8% solution of $NaHCO_3$ at 140° F., and subsequently allowed to drain for 2 minutes at ambient temperature. Next, a 15% solution of $H_2O_2$ at 160° F. was used to wet the kernels for 2 minutes. After the hydrogen peroxide step, the corn skin was loosened and mechanically removable, but with slight difficulty. A third step of soaking the kernels in 100° F. water facilitated skin removal.

In the second run, fresh corn kernels were first wetted for 2 minutes using an 8% solution of $NaHCO_3$ at 180° F., and subsequently allowed to drain for 2 minutes at ambient temperature. A 15% solution of $H_2O_2$ at 140° F. was then used to wet the kernels for 2 minutes. After the hydrogen peroxide step, the corn skin was substantially loosened and easily removable by light mechanical action or by plucking the skin from the kernel using the fingers.

Finally, in the third run kernels were wetted using an 8% solution of $NaHCO_3$ at 180° F. for 1 minute and 40 seconds and allowed to drain at ambient temperature for 2 minutes. For the peroxygen step, the kernels were wetted using a 10% solution of $H_2O_2$ at 140° F. for 1 minute and 40 seconds. Again the corn skin was substantially loosened and easily removable.

Corn is but one example of a grain seed for which the process of the present invention may be applied. The process is believed applicable for removing the hulls from many other grains, including wheat, rice, oats and barley.

C. Coffee Beans

Three experiments were also carried out in which the process according to the present invention was used on raw coffee beans. As with the beans and corn, the coffee beans were wetted, not soaked, with the alkaline and peroxygen solutions. The conditions and results are as follows:

First Run

Step 1—8% $NaHCO_3$ at 180° F. for 20 seconds, followed by 1 minute drain time at ambient temperature Step 2—10% $H_2O_2$ at 140° F. for 20 seconds.

Results—entire skin easily removed.

Second Run

Step 1—8% $NaHCO_3$ at 180° F. for 15 seconds, followed by 1 minute drain time at ambient temperature Step 2—10% $H_2O_2$ at 140° F. for 15 seconds.

Results—entire skin easily removed.

Third Run

Step 1—8% $NaHCO_3$ at 180° F. for 15 seconds, followed by 1 minute drain time at ambient temperature Step 2—10% $H_2O_2$ at 120° F. for 15 seconds.

Results—entire skin easily removed.

For purposes of comparison, raw coffee beans were soaked in 180° water for 2 minutes. Only portions of the skins could be removed without substantial difficulty.

It should be appreciated that the process of the invention may be applied to drupe seeds other than coffee beans. For example, shelled almonds and walnuts are seeds of drupes to which the process of the present invention is known to be applicable. During experiments applying the process of the present invention to shelled almonds follows, the nuts were first wetted using a 4% solution of $NaHCO_3$ at 160° for 30 sec, and subsequently wetted with a 15% $H_2O_2$ at 160° for 60 sec. The skins of the almonds were easily removable by light mechanical means.

In addition to coffee beans, almonds, and walnuts, the process of the present invention is also believed applicable to pecans, cashews, and pistachios. The process is also believed useful for removing the skins from the seeds of other drupes, such as peaches and apricots.

D. Nuts

In another experiment, the process according to present invention was applied to hazelnuts under the following conditions:

Step 1: 4% $NaHCO_3$ at 160° for 30 sec, followed by draining

Step 2: 15% $H_2O_2$ at 160° for 90 sec

Results: Skins removable.

Although the experiment was performed using hazelnuts, it should be appreciated that the process is applicable to other forms of nuts, including Brazil nuts, hickory nuts, and chestnuts.

A diagrammatic flowchart illustrating an apparatus which may be used for carrying out the invention is shown in FIG. 1. The apparatus generally comprises a pair of rotating spray drums 10, 12 which apply the sodium carbonate and hydrogen peroxide solutions to the seeds, a skin dislodging device 14 which mechanically removes the skins at the end of the process, and an air separator (not shown) which separates the removed skins from the seeds. Because, as described above, the temperature, concentration, and duration of exposure must be maintained within specified ranges, the apparatus is preferably designed to ensure that the solution applied to the seeds is maintained at the predetermined temperature and concentration values.

The seeds are carried on a standard conveyer 18 into the first spray drum 10. The spray drum 10 is positioned at a slight downward angle and includes a standard screw auger (not shown) for pushing the seeds through the spray drum. The various parameters for the spray drum configuration are dependent upon the amount of exposure time which is desired for the seeds. Positioned inside the spray drum 10 are two non-rotating rows 20, 22 of spray nozzles 24 which spray sodium carbonate solution onto the seeds as the seeds are rotated inside the spray drum. Two variables, the speed of rotation of the spray drum and the area of the inner surface 26 of the spray drum falling within the path of the spray 27, determine how long the seeds are exposed to the solution per rotation of the drum. A second two variables, the angle of the spray drum and the speed at which the screw auger pushes the seeds out of the drum, determine how long the seeds are inside the drum and thus how many times the seeds pass through the spray 27. These four variables must therefore be chosen based upon the length of time for which it is desired to expose the seeds to the solution. A variable speed spray drum is preferred to enable exposure time to be adjusted.

The spray nozzles 24 are preferably arranged in two parallel rows 20, 22 within the spray drum 10. The first row 20 is connected to a fresh source of sodium carbonate (not shown) while the second row 22 receives sodium carbonate from a recycle tank 28 positioned at the exit 40 of the spray drum. It is not necessary for the spray nozzles to deliver a high pressure stream of solution onto the seeds because the fluid pressure is not intended to be used for mechanical removal of skin. Because recycled solutions are delivered through the nozzles on the second row, large nozzles are preferable to prevent debris from clogging them. This will naturally result in a fairly low pressure spray.

The apparatus is preferably configured to recycle the runoff sodium carbonate, which is the sodium carbonate that runs off of the seeds during and after spraying, back onto the seeds through the second row 22 of spray nozzles. The runoff solution may carry dirt and other materials off the seeds and thus may become diluted. It is important, however, to maintain the concentration of the solutions being used to treat the seeds at a predetermined level so that the preselected concentration-dependant values for temperature and exposure time will be adequate for successful blanching of the seeds. As will next be described, the preferred apparatus recycles the runoff solution while maintaining the overall concentration of sodium carbonate being applied to the seeds.

A recycle tank 28 located at the bottom of the spray drum 10 collects the runoff solution as it flows out of the spray drum. This collected solution is passed through a trash screen 30, and a pump 31 pumps it to the second row 22 of spray nozzles 24 where it is sprayed onto the seeds. Positioned in the recycle tank 28 is a monitor 32 which detects the concentration of the runoff solution and which signals a concentration regulator 34 if adjustments in concentration are necessary. The concentration regulator 34 is located at the source of the fresh solution feeding into the first row 20 of spray nozzles 24. If the monitor 32 detects that the concentration of the solution in the recycle tank 28 is less than the predetermined concentration for treating the seeds, the concentration of the incoming fresh solution is increased so that the concentration of the mixture of fresh and recycled solutions reaching the seeds is maintained at the predetermined level.

The temperature of the solution should also be maintained at predetermined levels. The fresh source of sodium carbonate is heated to the desired temperature by conventional heating means (not shown). A thermostatic regulator (not shown) positioned in the recycle tank monitors the temperature of the run-off solution and makes necessary adjustments to the temperature of the runoff solution.

A conveyer 36 for transporting the seeds to a holding hopper 38 is positioned near the exit 40 of the spray drum 10. The holding hopper holds the seeds during the draining and drying period. After the draining and drying period, an elevator 42 carries the seeds from the holding hopper to a feed conveyer 44 which transports them into the second spray drum 12 for application of hydrogen peroxide.

The second spray drum 12 operates the same as the first, with concentration and temperature being monitored and adjusted as described above.

A conveyor 58 carries the seeds from the second drum 12 to a skin dislodging device 14, such as a rotating cylindrical brush, which separates the skins that have been loosened by the reaction of the sodium carbonate with the hydrogen peroxide as described above. A cylindrical brush may be preferable because it does not abrade the seeds but rather dislodges the already loosened skins by poking through them and pulling them away from the seeds. However, other forms of dislodging devices (including pneumatic separators, rubbing and/or tumbling devices) may be more appropriate depending on the size and fragility of the seeds being processed.

A final conveyor 16 next carries the seeds from the cylindrical brush or other skin dislodging device 14 to an air separator (not shown). At this point the seeds are likely to be mixed together with the pieces of skin that were removed by the dislodging device. The air separator uses an air stream to separate the relatively heavy seeds from the lighter weight skins.

While certain details of the invention have been illustrated and described herein it should be obvious that many modifications thereof may be made which fall within the scope of the following claims. For example, while specific examples having been given in which the process of the present invention is applied to the seeds of specific types of fruit (grains, drupes, and legumes) it should be understood that the process may be applied to other seeds, including those (such as pine nuts, rape seeds, sunflower seeds, safflower seeds, sesame seeds, and many others) for which experimental results have not been given.

We claim:

1. A method for removing skin from seeds in the class consisting of beans, corn, coffee beans and grains, the method comprising the steps of:

(a) providing a first solution of an alkaline compound, the first solution having a concentration of approximately 0.1% to saturated and a second solution of a peroxygen compound that is capable of reacting with the first chemical solution to form a gas, the second chemical solution having a concentration of approximately 2–40%;

(b) wetting a seed in the class consisting of beans, corn, coffee beans, and grains with the first solution;

(c) wetting the seed with the second solution, forming a gas between the seed and a skin on the seed to loosen the skin; and (d) removing the skin from the seed.

2. The method of claim 1 wherein step (a) provides sodium carbonate solution as the first solution and hydrogen peroxide solution as the second solution.

* * * * *